US008931038B2

(12) United States Patent
Pulier et al.

(10) Patent No.: US 8,931,038 B2
(45) Date of Patent: Jan. 6, 2015

(54) SYSTEM AND METHOD FOR A CLOUD COMPUTING ABSTRACTION LAYER

(75) Inventors: Eric Pulier, Los Angeles, CA (US);
Frank Martinez, La Canada, CA (US);
Duncan Christopher Hill, Toronto (CA)

(73) Assignee: ServiceMesh, Inc., Santa Monica, CA (US)

( * ) Notice: Subject to any disclaimer, the term of this patent is extended or adjusted under 35 U.S.C. 154(b) by 4 days.

(21) Appl. No.: 13/009,774

(22) Filed: Jan. 19, 2011

(65) Prior Publication Data

US 2011/0231899 A1 Sep. 22, 2011

Related U.S. Application Data

(63) Continuation-in-part of application No. 12/488,424, filed on Jun. 19, 2009, now Pat. No. 8,514,868.

(60) Provisional application No. 61/296,405, filed on Jan. 19, 2010.

(51) Int. Cl.
| | | |
|---|---|---|
| G06F 21/00 | (2013.01) | |
| H04L 29/08 | (2006.01) | |
| H04L 29/06 | (2006.01) | |
| H04L 12/46 | (2006.01) | |
| H04L 12/66 | (2006.01) | |
| G06F 9/50 | (2006.01) | |
| G06F 9/455 | (2006.01) | |

(52) U.S. Cl.
CPC .... *G06F 9/5072* (2013.01); *G06F 2009/45595* (2013.01); *H04L 67/10* (2013.01); *H04L 63/0272* (2013.01); *H04L 67/16* (2013.01); *H04L 12/4633* (2013.01); *H04L 67/34* (2013.01); *H04L 63/102* (2013.01); *H04L 12/66* (2013.01); *G06F 9/45558* (2013.01)
USPC .............................................. 726/1; 709/226

(58) Field of Classification Search
USPC ........................................................ 726/1, 2
See application file for complete search history.

(56) References Cited

U.S. PATENT DOCUMENTS

| 6,847,970 B2 | 1/2005 | Keller et al. |
| 6,880,002 B2 | 4/2005 | Hirschfeld et al. |

(Continued)

FOREIGN PATENT DOCUMENTS

| WO | WO-98/58356 | 12/1998 |
| WO | WO 2004012038 A2 * | 2/2004 |

(Continued)

OTHER PUBLICATIONS

Timothy Wood et al, The case for Enterprise-Ready Virtual Private Clouds, Jun. 19, 2009.

(Continued)

*Primary Examiner* — Jason K. Gee
*Assistant Examiner* — Maung Lwin
(74) *Attorney, Agent, or Firm* — Sheppard Mullin Richter & Hampton LLP

(57) ABSTRACT

According to one system of the invention, the system provides a cloud-computing service from a cloud-computing environment having a plurality of cloud-computing resources. The system may include a management module configured to manage a cloud-computing resource of the plurality of cloud-computing resources as a cloud-computing service, wherein the cloud-computing service performs a computer workload, an adapter configured to connect to the cloud-computing resource to the system and translate a management instruction received from the management module into a proprietary cloud application program interface call for the cloud-computing resource, a cloud service bus configured to route the management instruction from the management module to the adapter, a consumption module configured to allow a user to subscribe the cloud-computing service, a planning module configured to plan the cloud-computing service, and a build module configured to build the cloud-computing service from the cloud-computing resource.

38 Claims, 14 Drawing Sheets

(56) References Cited

U.S. PATENT DOCUMENTS

| | | |
|---|---|---|
| 7,698,230 B1 | 4/2010 | Brown et al. |
| 2003/0051021 A1* | 3/2003 | Hirschfeld et al. ........... 709/223 |
| 2003/0105810 A1 | 6/2003 | McCrory et al. |
| 2003/0177176 A1* | 9/2003 | Hirschfeld et al. ........... 709/203 |
| 2003/0182389 A1* | 9/2003 | Edwards ...................... 709/213 |
| 2006/0005162 A1 | 1/2006 | Tseng et al. |
| 2006/0056297 A1 | 3/2006 | Bryson et al. |
| 2006/0159116 A1* | 7/2006 | Gerszberg et al. ............ 370/431 |
| 2007/0180448 A1 | 8/2007 | Low |
| 2008/0306798 A1 | 12/2008 | Anke et al. |
| 2009/0228950 A1* | 9/2009 | Reed et al. ........................ 726/1 |
| 2009/0228967 A1 | 9/2009 | Gbadegesin |
| 2009/0300169 A1* | 12/2009 | Sagar et al. .................... 709/224 |
| 2009/0300210 A1* | 12/2009 | Ferris ............................. 709/235 |
| 2009/0300635 A1 | 12/2009 | Ferris |
| 2010/0212010 A1 | 8/2010 | Stringer et al. |
| 2011/0138047 A1 | 6/2011 | Brown et al. |
| 2011/0161915 A1 | 6/2011 | Srinivasamoorthy et al. |
| 2011/0231552 A1 | 9/2011 | Carter et al. |
| 2012/0005236 A1 | 1/2012 | Deng et al. |
| 2012/0192146 A1 | 7/2012 | Arnold et al. |
| 2013/0067225 A1 | 3/2013 | Shochet et al. |

FOREIGN PATENT DOCUMENTS

| | | |
|---|---|---|
| WO | WO 2009/155574 | 12/2009 |
| WO | 2012069064 | 5/2012 |

OTHER PUBLICATIONS

Timothy Wood, Improving Data Center Resource Management, Deployment, and Availability with Virtualization, Jun. 2009.

Ling Qian et al., Cloud Computing: An Overview, CloudCom 2009, pp. 626-631.

XEN Summit, Apr. 18, 2007 TJ Watson Research Center, The XEN-API, by Ewan Mellor.

XEN Management API, Version: API Revision 1.0.0, Date: Apr. 27, 2007, Stable Release, by Ewan Mellor, Richard Sharp and David Scott.

International Application No. PCT/US2014/030536, International Search Report and Written Opinion mailed Aug. 18, 2014.

International Application No. PCT/US2014/030599, International Search Report and Written Opinion mailed Aug. 28, 2014.

* cited by examiner

PLANNER

Assets
- Applications
- Workloads
- Servers
- Summary

Governance
- Task Inbox

Administration
- Score Config
- Score Report

| Application | View Options | Submission Options | Refresh |

Applications

| Name | Alias | Keyword | Planning State | Assignee | Ref ID | Cloud Readiness Score |
|---|---|---|---|---|---|---|
| ▼ Corporate Blog Application | corporate blog | blog | Identified | Thomas Patrick | NAR: 12345-ABC | |
| name | Alias | Keyword | Planning State | Assignee | Ref ID | Cloud Readiness Score |
| ⊙ Flatpress Blog Engine | Flatpress | Flatpress | Approved | Dave Argentina | NAR: 12345-ABC | 8.29 |
| Related Assets — New  Add | | | | | | |
| ▼ Logistics | | | Identified | | | |
| | name | Alias | Keyword | Planning State | Assignee | Ref ID | Cloud Readiness Score |
| ⊙ SM Linux with WSO2 Enterprise | | | Deferred | John Catta | | 8.65 |
| Related Assets — New  Add | | | | | | |

Max Per Page: 25

FIG. 9A

BUILDER

Workloads | Stacks | Scripts

Stacks start with a base image, then apply scripts and targets.

| Name | ▲ Base Stack | Operating System | Targets | Creator | Create Date | Status |
|---|---|---|---|---|---|---|
| Flatpress Blog Engine | SM Linux (CentOS 5.3) Desktop | Linux | ⊘ 🖥 | admin | Wed Feb 24 2010 03:54:59 PM | Building... |
| Linux (CentOS 5.3) | | Linux | ⊘ 🖥 | admin | Mon Feb 8 2010 03:37:49 PM | Published |
| Linux (Suse 11.1 Enterprise) | | Linux | ⊘ 🖥 | admin | Mon Feb 8 2010 03:37:49 PM | Published |
| SM Linux (CentOS 5.3) | | Linux | ⊘ 🖥 | admin | Mon Feb 8 2010 03:37:49 PM | Published |
| SM Linux (CentOS 5.3) Desktop | | Linux | ⊘ 🖥 | admin | Mon Feb 8 2010 03:37:49 PM | Published |
| SM Linux (Suse 11.1 Enterprise) | | Linux | ⊘ 🖥 | admin | Mon Feb 8 2010 03:37:49 PM | Published |
| SM Solaris | | Solaris | ⊘ 🖥 | admin | Mon Feb 8 2010 03:37:49 PM | Published |
| SM Windows 2003 | | Windows | ⊘ 🖥 | admin | Mon Feb 8 2010 03:37:49 PM | Published |
| SM Windows 2003 Auth | | Windows | ⊘ 🖥 | admin | Mon Feb 8 2010 03:37:49 PM | Published |
| SM Windows 2003 IIS | | Windows | ⊘ | admin | Mon Feb 8 2010 03:37:49 PM | Published |
| Solaris | | Solaris | ⊘ | admin | Mon Feb 8 2010 03:37:49 PM | Published |
| Windows 2003 | | Windows | ⊘ 🖥 | admin | Mon Feb 8 2010 03:37:49 PM | Published |

🔍 ▢                                                    1 or 1                              Max Per Page: 25

[Add] [Change] [Remote] [Clone]  [Build] [Import]  [Publish to Agility CenterPoint] [Un-Publish]   [View in Agility Manager]

▼ Task List

| Operation | Status | Started | Completed |
|---|---|---|---|
| Provisioning Instance Flatpress Blog Engine-EC2 Demo Account-1 | Creating Instance | Wed Feb 24 2010 03:55:15 PM | |
| Provisioning Instance Flatpress Blog Engine-vSphere Provider Account-1 | Creating Instance | Wed Feb 24 2010 03:55:15 PM | |

[Clear]

SYSTEM AND METHOD FOR A CLOUD COMPUTING ABSTRACTION LAYER

CROSS-REFERENCE TO RELATED APPLICATIONS

This application is a continuation-in-part of and claims priority from U.S. patent application Ser. No. 12/488,424, filed Jun. 19, 2009, which is hereby incorporated herein by reference in its entirety. This application claims priority from U.S. Provisional Patent Application No. 61/296,405, filed Jan. 19, 2010, which is hereby incorporated herein by reference in its entirety.

FIELD OF THE INVENTION

The present invention relates to the field of cloud computing, and more particularly, the invention relates to systems and methods for securing, controlling and managing cloud infrastructure.

DESCRIPTION OF THE RELATED ART

Companies have begun offering businesses a new cloud computing outsourcing option that promises reduced costs, improved availability, improved scalability, and reduced time to deploy new applications. These companies act as managed service providers that rent virtual computer, storage, and Internet connectivity services for variable periods on a pay-per-use basis from large pools of re-purposable. multi-tenant computing resources. Such cloud infrastructure providers include Amazon Web Services®, Amazon EC2®, GoGrid®, Joyent®, and Mosso®.

Many businesses, however, are currently unable to use cloud infrastructure because of a lack of security, control, and manageability of the computing capacity rented from the cloud infrastructure providers. These problems prevent such businesses from maximizing their use of cloud infrastructure, which includes virtual server instances, storage, and Internet bandwidth.

BRIEF SUMMARY OF EMBODIMENTS OF THE INVENTION

According to various embodiments of the invention, systems and methods are provided for one or more cloud computing abstraction layers. Through various embodiments of the present invention, a user can plan cloud-computing services, build a cloud-computing service, publish the cloud-computing service for consumption by users, or run the cloud-computing service. Some embodiments of the present invention provide access to disparate public or private cloud-computing resources through a common interface. Additionally, some embodiments can apply governance uniformly over disparate public or private cloud-computing resources.

Some systems may, for example, enable: self-service access to cloud-computing resources by end-users, developers, and admins; automated services with respect to cloud-computing services comprising of one or more cloud-computing resources (e.g., management, building, configuration, publication, validation, and development and deployment of cloud-computing services); rapid provisioning (e.g., deployment, release, scheduling, control etc.) of cloud-computing resources within a cloud-computing service; governance control of cloud-computing resources within a cloud-computing service (e.g., application of security and non-security policies to cloud-computing resources), audit control of cloud-computing services; or secure access to cloud-computing services. Accordingly, embodiments of the present invention provide on-demand access by internal users, external users (e.g. customers, service partners), and developers to cloud-computing services, such as infrastructure-as-a-service (IaaS), platform-as-a-service (PaaS), and software-as-a-service (SaaS), provided from a governed federation of internal (private cloud) and external cloud (commercial cloud) service providers. Some such embodiments allow for rapid and dynamic deployment and scaling of cloud-computing services. A private cloud may comprise, for example, Eucalyptus Systems, VMWare vSphere®, or Microsoft® HyperV; and a public cloud may comprise, for example, Amazon EC2®, Amazon Web Services®, Terremark®, Savvis®, or GoGrid®.

According to one system of the invention, the system provides a cloud-computing service from a cloud-computing environment comprising a plurality of cloud-computing resources, the system comprising: a management module configured to manage a cloud-computing resource of the plurality of cloud-computing resources as a cloud-computing service, wherein the cloud-computing service performs a computer workload and the cloud-computing service comprises the cloud-computing resource; an adapter configured to connect to the cloud-computing resource to the system and translate a management instruction received from the management module (e.g., intermediate representation of a command from a client) into a cloud application program interface call for the cloud-computing resource (e.g. proprietary API call for Amazon EC2®); a cloud service bus configured to route the management instruction from the management module to the adapter; a consumption module configured to allow a user to subscribe the cloud-computing service; a planning module configured to plan the cloud-computing service; and a build module configured to build the cloud-computing service from the cloud-computing resource and publish the cloud-computing service to the consumption module. In some such embodiments, the system provides a user interface configured to provide access to the system as a virtual private cloud. The system may further comprise a cloud model utilized by the adapter to translate the management instruction to the (target) cloud API call.

In certain embodiments, the virtual private cloud is utilized for operation of a cloud-computing service in accordance with the present invention. In particular embodiments, a computer workload (e.g., application, server software, software development environment, software test environment) is a unit of computing processing that is performed via an IaaS, PaaS, or SaaS. For example, IaaS may comprise instances of Microsoft® Windows or Linux running on a virtual computer, or a Desktop-as-a-service (DaaS) provided by Citrix® or VMWare®; a PaaS may comprise a database server (e.g., MySQL® server), Samba server, Apache® server, Microsoft® IIS.NET server, Java® runtime, or Microsoft® .NET® runtime, Linux-Apache-MySQL-PHP (LAMP) server, Microsoft® Azure, or Google® AppsEngine; a SaaS may comprise SalesForce®, Google® Apps, or other software application that can be deployed as a cloud service, such as in a web services model. A cloud-computing resource may be a physical or virtual computing resource (e.g., virtual machine). In some embodiments, the cloud-computing resource is a storage resource (e.g., Storage Area Network (SAN), Network File System (NFS), or Amazon S3®), a network resource (e.g., firewall, load-balancer, or proxy server), an internal private resource, an external private resource, a secure public resource, an infrastructure-as-a-service (IaaS) resource, a platform-as-a-service (PaaS)

resource, or a software-as-a-service (SaaS) resource. Hence, in some embodiments, a cloud-computing service provided may comprise a IaaS, PaaS, or SaaS provided by private or commercial (e.g., public) cloud service provider, such as Amazon Web Services®, Amazon EC2®, GoGrid®, Joyent®, Mosso®, or the like.

In various embodiments, the management module that manages the cloud-computing service comprises provisioning the cloud-computing service for a virtual private cloud, releasing the cloud-computing service for the virtual private cloud, accounting for usage of the cloud-computing service in the virtual private cloud, or monitoring the cloud-computing service. For example, in some embodiments, the management module manages cloud-computing resources for a cloud-computing service being offer by the system by provisioning a cloud-computing resource for the cloud-computing service, deploying a cloud-computing resource for the cloud-computing service, or releasing a cloud-computing resource being used by the cloud-computing service. In some embodiments, the provisioning involves starting, stopping, or generally controlling an instance of a cloud-computing resource (e.g., IaaS providing an instance of Linux) on behalf of a cloud-computing service. For example, an embodiment may launch scripts to start an instance of a cloud-computing resource, launch scripts to securely (e.g., via encryption) attach a file system (e.g., a storage volume) to the instantiation of the cloud-computing resource (e.g., so that the cloud-computing resource can access local or remote client data securely), and then connect a client to the instantiation through a virtual private network (VPN) connection between the client's local network and the cloud providers network.

In further embodiments, the management module is further configured to perform collection and maintenance of cost and consumption of various cloud-computing resources such as CPU-time, storage volume consumption, network I/O and other configurable cloud-computing cost and consumption factors. For example, in some embodiments where the management module accounts for usage of one more cloud-computing services by a client collecting, aggregating and providing this information through a API to customer billing systems while also presenting reporting through the consumption module demonstrating cost and consumption comparisons, projections and usage. Some embodiments may utilize Ariba®, SAP®, or the like to facilitate accounting and billing of usage of cloud-computing service.

In some embodiments, the build module allows a developer to create a cloud-computing service (e.g., IaaS, PaaS, and SaaS) comprising one or more cloud-computing resources. The build module may utilize build scripts to build a cloud-computing service from one or more cloud-computing resources, configure a cloud-computing service, or publish a cloud-computing service for consumption In various embodiments, a cloud-computing service may be published to a consumption module that allows an end-user to subscribe to the cloud-computing service and utilize the service. In some embodiment, the end-user may access and subscribe to the cloud-computing service through user interface that lists published and available cloud-computing services. For example, the user interface may be a storefront through which an end-user may preview and select a cloud-computing service for use.

With some embodiments, an organization can determine the most suitable deployment of a computer workload to a cloud-computing environment, or determine the value/benefit of deploying a computer workload to a cloud-computing environment. For some embodiments, the planning module analyzes a computer workload or workflow that may have previously been on a physical or virtual computing resource and assists in migrating or importing the computer workload or workflow to the clouding-computing environment. In further embodiments, the planning module assesses difficulty in migrating or importing the computer workload or workflow, and the efficiency or value of using the cloud-computing environment. In other embodiments, the planning module determines the correct placement of a computer workload or workflow to an appropriate cloud-computing service based on the profile or characteristics of the computer workload (e.g., determine that the computer workload or workflow needs to be performed within secure cloud/public cloud/private cloud). For example, for a trading platform, which needs a low latency-computing environment that is secure, an embodiment may recommend placement of trading platform in a cloud-computing service comprising a be used for long-term storage of non-sensitive data, an embodiment may recommend configuration of the platform to use cloud-computing services comprising a public cloud resource, or a combination of cloud and physical resources, such as archival tape storage resources. Further, the placement decision is guided by policy which ensures the cloud-computing resource is placed in the appropriate cloud-computing service.

In particular embodiments, the system further comprises policy engine module configured to enforce a policy on the cloud-computing service through the management module. For example, in some embodiments, the management module monitors a cloud-computing resource of the cloud-computing service through the adapter and provisions the cloud-computing resource according to the policy engine module. Additionally, for some embodiments, the management module monitors a cloud-computing resource's performance using Ganglia Monitoring System or collectd (an open source daemon that collects system performance statistics periodically).

In some embodiments, the system further comprises an identity management module configured to connect to an authentication system and authenticate the user for the cloud-computing service. For example, in some embodiments, the identity management connects to disparate authentication systems (e.g., Netegrity®, Oracle OAM®, Microsoft® Active Directory, RSA® Cleartrust, or Lightweight Directory Access Protocol (LDAP), Kerberos) to create a federated authentication system that allows unified authentication to a cloud-computing service.

In various embodiments, the system further comprises an encryption module configured to perform encryption services for the cloud-computing service. For example, the encryption services can include encryption of data on a storage device or data communicated over a network connection. In other embodiments, the system further comprises a connection module configure to securely connect the cloud-computing service to a client network or a cloud provider network. For example, a connection module may be deployed on a client network or a cloud provider network to facilitate a secure network connection between cloud-computing service and a client network.

According to some embodiments, a method is provided for a cloud-computing environment comprising a plurality of cloud-computing resources, the method comprising: providing a virtual private cloud configured to utilize a cloud-computing resource from the plurality of cloud-computing resources to perform a computer workload; receiving a request to perform the computer workload within the virtual private cloud, provisioning the cloud-computing resource from the plurality of cloud-computing resources; deploying the cloud-computing resource within the virtual private cloud; and using the cloud-computing resource to perform the computer workload.

As noted before, the cloud-computing resource may be a virtual (e.g., virtual machine) or physical cloud-computing resource (e.g., dedicated server). For example, the cloud-computing resource may be a virtual computing resource where the virtual computing resource is deployed under control of a virtual machine manager. The cloud-computing resource may be a storage resource, a network resource, an internal private resource, an external private resource, a secure public resource, a platform-as-a-service (PaaS), a software-as-a-service (SaaS), or an infrastructure-as-a-service (IaaS). The cloud-computing resource may be a hybrid cloud-computing resource comprising at least two of a physical resource, a virtualized resource, a private resource, a public resource, an internal resource, or an external resource.

In some embodiments, the method further comprises receiving a constraint for the cloud-computing resource or for a computer workload that may be deployed on the cloud-computing resource, wherein the cloud-computing resource is a cloud-computing resource; and applying the constraint on the cloud-computing resource such that, when the cloud-computing resource is used to perform the computer workload, the cloud-computing resource's operation is limited according to the constraint. In other embodiments, the method further comprises declaring a static network address for the computer workload.

In some embodiments, the method further comprises: defining a security zone such that the security zone comprises the virtual private cloud; and applying a security policy to the security zone such that, when the cloud-computing resource deployed in the virtual private cloud that is used to perform the computer workload, the cloud-computing resource's operation or the performance or operation of the computer workload is subject to, the security policy. The security zone may be defined according to a physical location of the virtual private cloud's usage, a network location of the virtual private cloud's usage, or an attribute of an organization associated with the virtual private cloud. The security policy may be an access policy, a read-permission policy, a write-permission policy, an edit-permission policy, a privacy-based policy, a policy regarding a required level or type of encryption, a cloud-computing resource utilization policy, or other policy. For example, a security zone may be defined as a specified virtual private network (VPN) or a specified physical network of a business enterprise, such that computer workloads being performed by a cloud-computing resource operating in that zone may be modified only by users who have specified authorization credentials issued by that enterprise. Among some embodiments, a security zone may be defined as cloud-computing resources (public or private) that are physically located in a geographical area, such as the United States, allowing a security policy to be applied that prohibits export of data that is to be associated with computer workloads executed in that security zone.

In additional embodiments, the method further comprises: receiving at a central policy server a definition for a security policy, wherein the central policy server is configured to associate the security policy to the computer workload or to the cloud-computing computing resource performing the computer workload; and pushing the security policy to the cloud-computing resource.

For some embodiments, provisioning the cloud-computing resource comprises: locating an unreserved cloud-computing resource within the plurality of cloud-computing resources; and reserving for the virtual private cloud the unreserved cloud-computing resource.

In embodiments where the cloud-computing resource is an infrastructure element, and the method further comprises: providing a user interface that allows a user to deploy or configure the infrastructure element; setting, through the user interface, a policy to the infrastructure element or to a computer workload that may be deployed on the infrastructure element; and applying the policy to the infrastructure element when the infrastructure element or computer workload is deployed within the virtual private cloud. The method further comprises: determining a reference design for the infrastructure element; and deploying the infrastructure element in the virtual private cloud according to the reference design.

In other embodiments, the method further comprises: associating a policy with the computer workload to be performed within the virtual private cloud; and applying the policy to the cloud-computing resource performing the computer workload during the computer workload's performance.

In additional embodiments, receiving the request to perform the computer workload or the application of the policy to the computer workload comprises: receiving an application to be migrated to cloud-computing environment for execution; and identifying the computer workload as necessary for executing the application.

In further embodiments, the method further comprises: using an adapter to connect the virtual private cloud to one or more other cloud-computing resources, such as of the types described herein; using a metamodel data structure to store an association between a computer workload and a policy; and pushing the metamodel data structure to the adapter such that, when the cloud-computing resource is deployed to perform the computer workload, the adapter applies the policy to the computer workload or to the cloud-computing resource performing the computer workload. In some such embodiments, when a computer workload is moved from using one cloud-computing resource to a second cloud-computing resource, the method may further comprise pushing the metamodel data structure to a second adapter that connects the second cloud-computing resource to the virtual private cloud such that when the second cloud-computing resource is deployed, such as within the virtual private cloud to perform the computer workload, the second adapter applies the policy to the second cloud-computing resource performing the cloud computer workload.

In other embodiments, the method comprises identifying the cloud-computing resource for performing the computer workload. Identifying the cloud-computing resource may be based on a computer workload score determined by a scoring logic. The scoring logic may be, for example, based on a business attribute of the computer workload, a technical attribute of the computer workload, or an operational attribute of the computer workload. In further embodiments, the scoring logic uses a mix of at least two of a business attribute, an operational attribute and a technical attribute. In various embodiments, the scoring logic may be editable or may be dynamically updated at or near real-time.

In some embodiments, the computer workload may be scalable. For example, the computer workload may be scaled down to decrease the computer workload's use of memory and processing time during performance within a virtual private cloud or actually increase or decrease the number of cloud-computing resources which execute the computer workload. In further embodiments, the scaling is based on a policy, which may be associated with the computer workload, stored in a meta model, and pushed via an adaptor to or among various cloud computing resources.

In some embodiments, deploying the cloud-computing resource comprises deploying a pre-determined set of cloud-computing resources to optimize the computer workloads' performance.

In further embodiments, the method further comprises setting a condition for the computer workload, wherein the condition determines if or when the cloud-computing resource can be deployed within the virtual private cloud to perform the computer workload.

According to other embodiments, a method is provided for a cloud-computing environment comprising a plurality of cloud-computing resources, the method comprising: receiving a computing workflow to be performed in the cloud-computing environment; identifying a computer workload to perform the computing workflow; associating a policy with the computer workload; testing the computer workload in a pre-production virtual private cloud (e.g., computing environment) within the cloud-computing environment; deploying the computer workload in a production virtual private cloud (e.g., computing environment) within the clouding-computing environment; and applying the policy to the computer workload during the computer workload's performance within the production virtual private cloud for consumption. In some such embodiments, identifying the computer workload to perform the computing workflow involves identifying a plurality of computer workloads to perform the computing workflow.

According to further embodiments, various operations described above are implemented using a computer. For example, some embodiments provide for a computer program product comprising a computer useable medium having program instructions embodied therein for performing operations similar to those performed by methods according to the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 9A-9D are screenshots of an example user interface in accordance with some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for a cloud computing abstraction layer. Through various embodiments of the present invention, a user can plan cloud-computing services, build a cloud-computing service, publish the cloud-computing service for consumption by users, or run the cloud-computing service. Some embodiments of the present invention provide access to disparate public or private cloud-computing resources through a standard interface. Additionally, some embodiments can apply governance uniformly over disparate public or private cloud computing resources.

Some systems may, for example, enable: self-service access to cloud-computing resources by end-users, developers, and admins; automated services with respect to cloud-computing services comprising of one or more cloud-computing resources (e.g., management, building, configuration, publication, validation, and building of cloud-computing services); rapid provisioning (e.g., deployment, release, scheduling, control etc.) of cloud-computing resources within a cloud-computing service; governance control of cloud-computing resources within a cloud-computing service (e.g., application of security and non-security policies to cloud-computing resources), audit control of cloud-computing services; or secure access to cloud-computing services.

Figure 1:
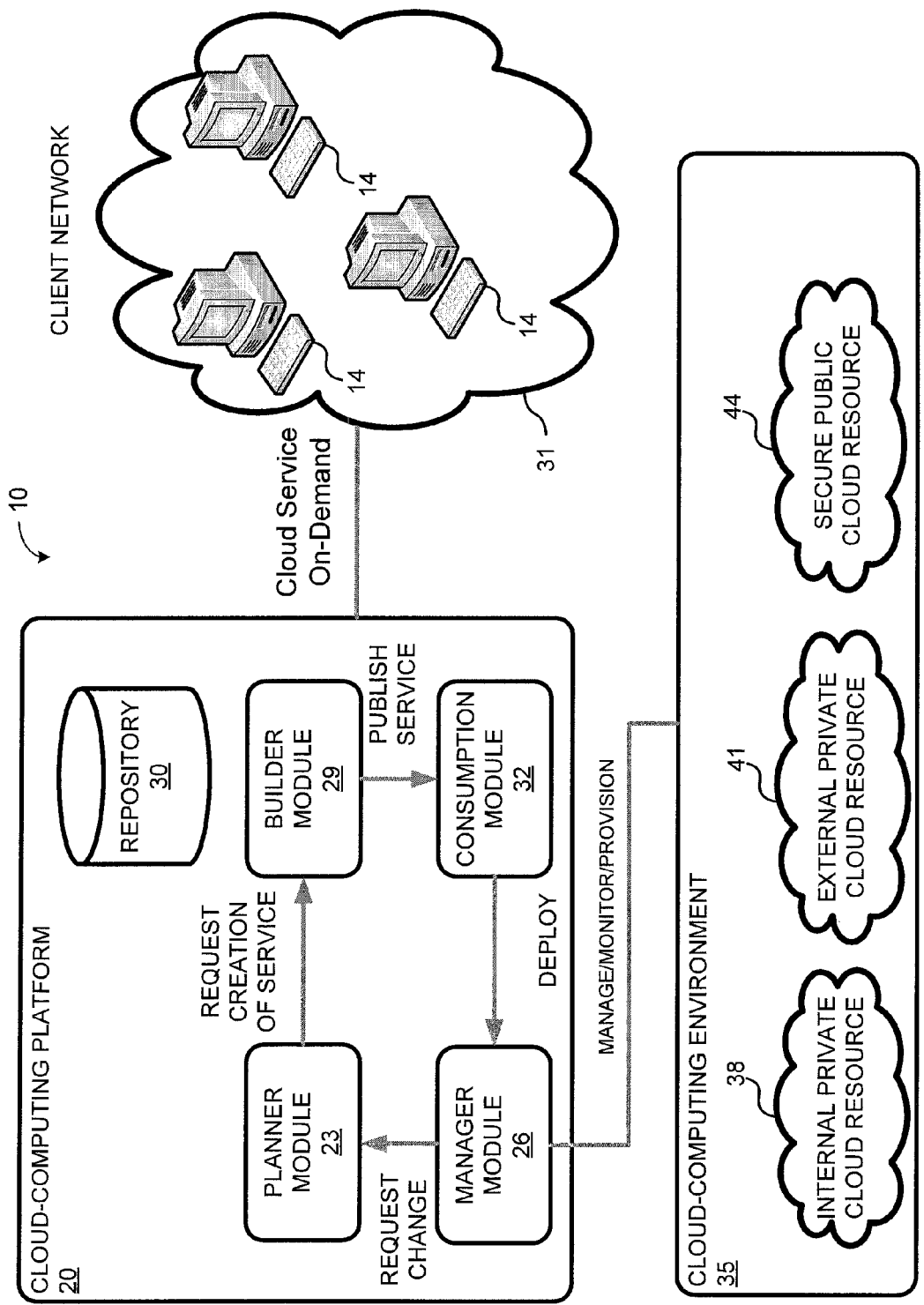
FIG. 1 is a diagram illustrating an example system in accordance with an embodiment of the present invention.

FIG. 1 is a diagram illustrating an example system 10 in accordance with an embodiment of the present invention. FIG. 1 illustrates a cloud-computing environment 35 comprising one or more cloud-computing resources, a client network 31 comprising client computing devices 14 (e.g., desktops, laptops, smart mobile devices), and a cloud-computing platform 20 in accordance with one embodiment of the invention. In illustrated system 10, cloud-computing platform 20 provides a system through which computing devices residing on client network 31 (e.g., enterprise network) can access one or more cloud-computing services. A cloud-computing service comprises a cloud-computing resource residing within the cloud-computing environment 35 and managed by the cloud-computing platform to provide the cloud-computing service. Depending on the embodiment, cloud-computing environment 35 may comprise one or more cloud providing networks that include cloud-computing resources (e.g., cloud services provided by public or private clouds) that can be utilized by users. Additionally, depending on the embodiment, platform 20 may reside on a client network 31 or separate from a client network 31.

Cloud-computing environment 35 may comprise an internal cloud, an external cloud, a private cloud, or a public cloud (e.g., commercial cloud). In the embodiment of FIG. 1, cloud-computing environment 35 comprises internal private cloud resource 38, external private cloud resource 41, and secure public cloud resource 44. A private cloud may be implemented using a variety of cloud systems including, for example, Eucalyptus Systems, VMWare vSphere®, or Microsoft® HyperV. Providers of public clouds may include, for example, Amazon EC2®, Amazon Web Services®, Terremark®, Savvis®, or GoGrid®. Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs).

By using cloud-computing platform 20 to plan, build, manage, or use cloud-computing resources within a cloud-computing environment, users of platform 20 are provided with standardized access to a variety of cloud-computing resources from disparate cloud-computing systems and providers without concerning themselves with the proprietary details of accessing such cloud-computing systems and providers. Additionally, users of platform 20 can access cloud-computing services through platform 20 on-demand on a self-service basis through the standardized access. Users of cloud computing services offered by platform 20 may include end-users, developers, partners, or administrators that reside on the client network 31.

Platform 20 may comprise planner module 23, manager module 26, builder module 29, and consumption module 32. Planner module 23 is configured to plan cloud-computing service provided by platform 20 by inventorying, profiling, and prioritizing computer workloads, such as programs, applets, calculations, applications, servers, or services. For example, with respect to software/application development, planner module 23 may model current applications and associated software-development life cycle (SDLC) phases to determine what infrastructure environments would be required or preferred. This may include defining security, privacy, management or other profiles for each SDLC phase of each application. The profiles, in turn, will identify existing infrastructure and systems that support the SDLC phases, and manage relationships between the infrastructure, systems and the applications. Profiles may also contain characteristics regarding the SDLC phases or attributes relevant to development, deployment or performance of infrastructure, systems, or workloads, such as latency, geography, responsiveness, bandwidth, storage capacity, processing speed, processing type, platforms involved, data involved, protocols used, and specific institutional requirements. In terms of prioritizing the cloud-computing services needed for the SDLC phases, planner 23 may first identify which SDLC computing environments and systems would be suitable for cloud computing or migration to cloud computing, and then prioritize the enablement and operability of newly developed or migrated computer workloads according to the SDLC phases. Subsequently, the characterizations determined by planner module 23 can be used by builder module 29 to build a cloud-computing service or to deploy a computer workload to a cloud-computing resource.

Builder module 29 is configured to assemble, validate, and publish a cloud-computing service or computer workload for consumption (i.e., use) by a user. Builder module 29 may be configured to receive characterization information from planner module 23 and build a cloud-computing service or computer workload based on the information. For example, builder module 29 may be configured to assemble a cloud computing service based on the prioritized list of computer workloads provided by planner module 23. Builder module 29 may be configured to create and edit scripts for loading computer workloads during installation, startup, runtime, and shutdown of cloud-computing services assembled by builder 29. The scripts for the cloud-computing services may be verified and validated before the cloud-computing services are published for consumption (i.e., use). The script may have access to metamodel and policy information which may alter how the script uses the meta model and policy information to make a decision. Additionally, builder module 29 may be configured to associate the computer workload with the appropriate cloud-computing service or resource (e.g., associate an application with an appropriate underlying virtual machine image or associate a computer workload with a specific network).

Eventually, builder module 29 can publish a cloud-computing service for consumption by users. In some embodiments, the build module 29 will publish the cloud-computing service to a consumption module 32 (e.g., store or storefront such as an application store, a service store, or a software stack store) where users can preview, select, and subscribe to a cloud-computing service for use. Further, in some embodiments, the builder module 29 will enter the cloud-computing service in repository 30 when it is ready and available for consumption by users. Embodiments may also be configured the builder module 30 such that the development community can approve or disapprove of the cloud-computing service before publication.

Consumption module 32 is configured to allow a user to subscribe to, collaborate on, and assess a cloud-computing service published for consumption. For example, a user can preview cloud-computing services available for deployment to the virtual private cloud and consumption. Then, when a user wants to subscribe and invoke a cloud-computing service for usage, the user can invoke the cloud-computing service on a self-service, on-demand basis through the consumption module 32. Consumption module 32 may list published available cloud-computing service at or near real-time, and allow a user to request updates and information on a listed cloud-computing service. In some embodiments, the consumption module 32 may allow users to collaborate on where, what, and how many cloud-computing services are deployed for consumption. In further embodiments, consumption module 32 may allow a user to comment on and rate cloud-computing services, or assess the cost associated with deploying and using a cloud-computing service.

Manager module 26 is configured to provision one or more cloud-computing resources for a cloud-computing service or computer workload, manage one or more cloud-computing resources for the cloud-computing service or computer workload, and monitor one or more cloud-computing resources for the cloud-computing service or computer workload. For example, manager module 26 may provision one or more cloud-computing resources (e.g., provision one or more virtual machine instances) for a published cloud-computing service that is invoked from the consumption module 32. Upon invoking the cloud-computing service, the manager module 26 may deploy and start the one or more cloud-computing resources to the virtual private cloud for the cloud-computing service.

With respect to control, manager module 26 may control the start, stop, or run-time of one or more cloud-computing resources (e.g., control start, stop, or run-time of virtual machine instance) for a cloud-computing service. Manager module 26 may further schedule the start and stop time windows for the one or more cloud-computing resources, or govern a service level, such as per a service level agreement (SLA), or a threshold associated with the one or more cloud-computing resources. Through its control, manager module 26 can govern the cloud-computing resource according to conditions, constraints, security policies, or non-security policies. Manager module 26 may also monitor the one or more cloud-computing resources, detect security intrusions, and monitor the consumption of cloud-computing services their associated cloud-computing resources in order to determine the costs accrued by a user. Aspects of cloud-computing resources monitored by manager module 26 include, for example, central processing unit (CPU) usage, memory usage, data storage usage, data input/output usage, application usage, workload usage, service usage, and other attributes of usage of a service or a computer workload.

In some embodiments, manager module 26 is configured such that a user can request planner module 23 change the design of a cloud-computing service. For example, a user may request that the cloud-computing service change or computer workload with respect to the cloud-computing resources utilized (e.g., change to a platform stack).

Figure 2A:
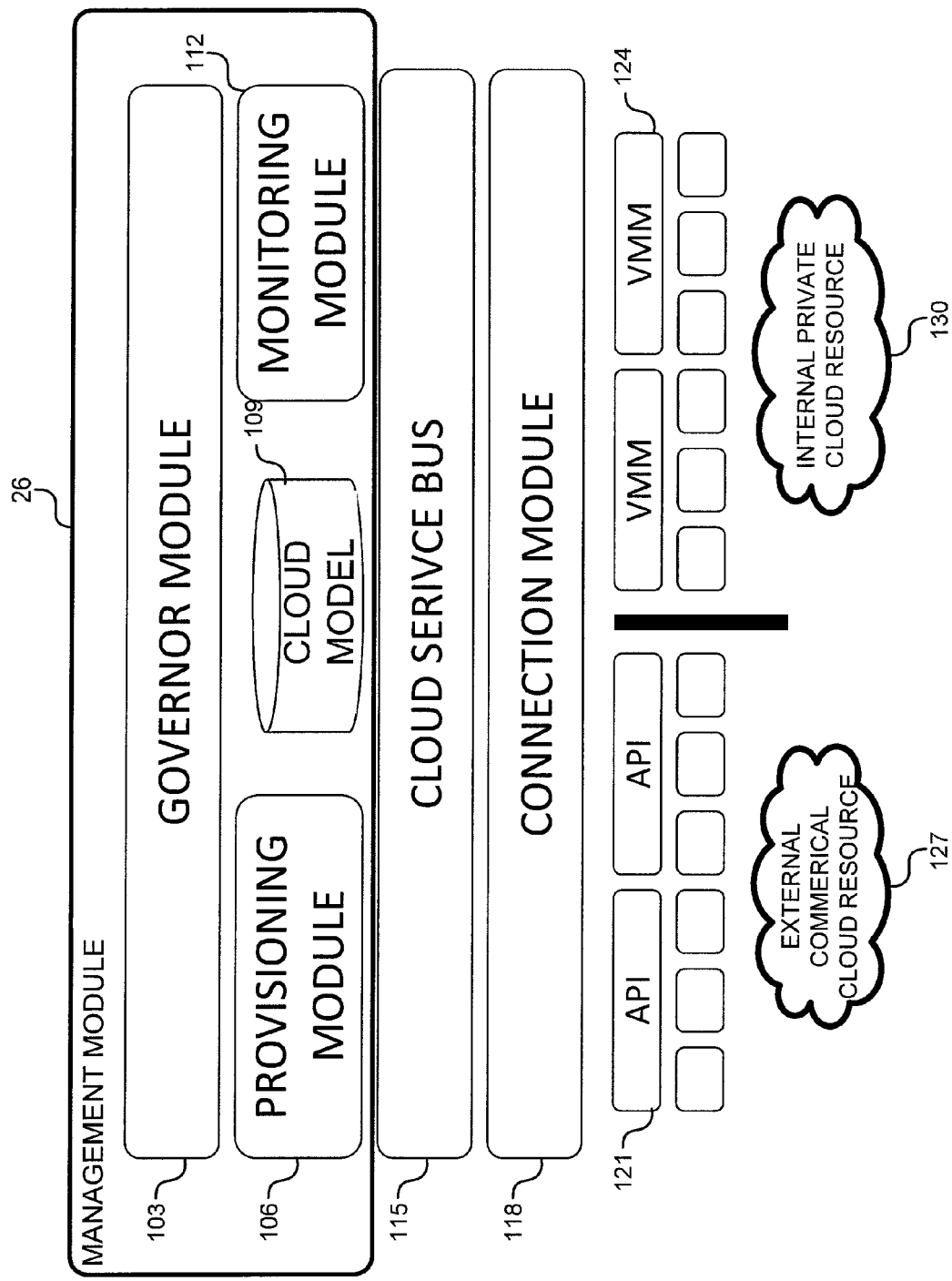
FIG. 2A is a diagram illustrating an example management module in accordance with an embodiment of the present invention.

FIG. 2A is a diagram illustrating example management module 26 in further detail. As illustrated, management module 26 comprises governor module 103 configured to govern operation of a cloud-computing services and its associated cloud-computing resources, provisioning module 106 configured to provision cloud-computing resources for a cloud-computing service, and monitoring module 112 configured to facilitate the various monitoring functions of management module 26.

As noted before, various embodiments of the present invention provide standardized access, management, or control to different types of cloud-computing resources on a self-service, on-demand basis without the user needing to know the specific instructions or details for accessing, managing, or controlling those different target cloud-computing resources.

In order to translate a standard management action for a cloud-computing service to instructions for its cloud-computing resource and/or instructions for a computer workload to be executed on a cloud-computing resource, some management modules may comprise a cloud model data store 109 that maps the management action to the appropriate cloud-computing resources. Subsequently, the management action is translated to one or more instructions for a target cloud-computing resource and/or a computer workload operating thereon.

Cloud service bus 115 may be utilized to parse management instructions received from the manager module 26, transform the management instructions to instructions compatible with the target cloud-computing resource, and route the management instruction to the targeted cloud-computing resource. In some embodiments, the cloud service bus 115 then routes the instructions to the application program interface (API) for a target cloud-computing resource from external commercial cloud resource 127, or to the virtual machine manager (VMM) (i.e., hypervisor) for a target cloud-computing resource from internal private cloud resources 130.

Figure 2B:
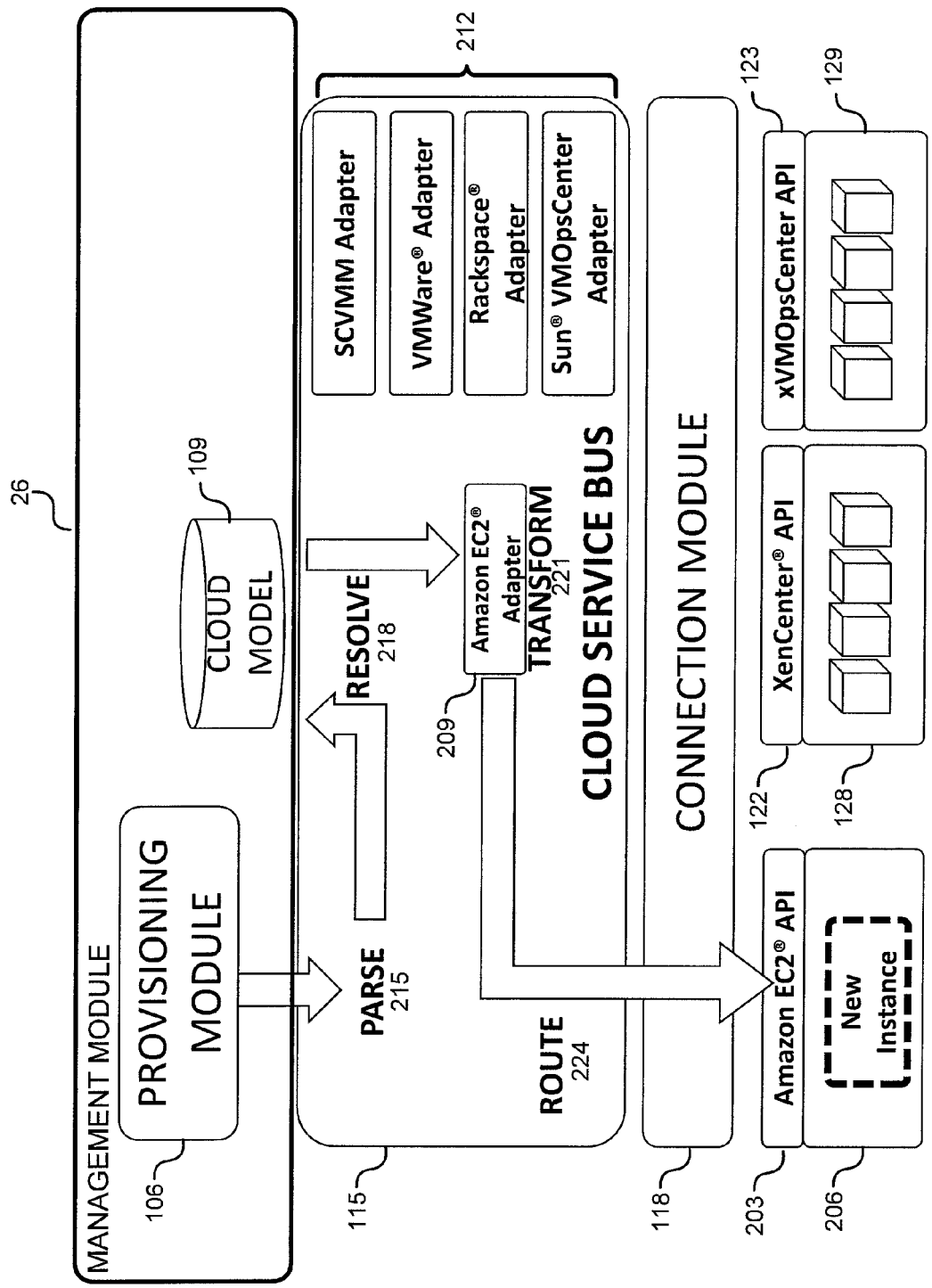
FIG. 2B is a diagram illustrating an example management module in accordance with an embodiment of the present invention.

FIG. 2B illustrates an example flow of management instructions from manager module 26 to a commercial cloud API. As illustrated in FIG. 2B, provisioning module 106 of management module 26 transmits a management action for a cloud-computing service currently deployed within a virtual private cloud (VPC) or a cloud-computing resource to be deployed in the virtual private cloud. Cloud service bus 115 receives the management action, parses (215) the action, and utilizes cloud model data store 109 to resolve (218) the action to the appropriate one or more cloud-computing resources associated with the cloud-computing service.

These management actions are then translated to target-specific instructions (e.g., commercial hypevisor API calls) by a target-specific adapter that connects one or more cloud-computing resources to one or more other cloud-computing resources or to the cloud-computing platform. Given the disparate types of cloud providers and systems that exist, each having a proprietary interface for access, management, and control, some embodiments utilize a target-specific adapter in order to connect to and interface with cloud-computing resources provided by those different cloud providers and systems.

In the illustrated embodiment, once target-specific instructions have been determined, cloud service bus 115 routes the instructions to Amazon EC2® adapter 209, which transforms (221) (or translates) the management action to one or more target-specific instructions that are routed to the Amazon EC2® API 203 for execution on the Amazon EC2® cloud-computing environment 206. Other adapters illustrated include Microsoft® System Center Virtual Machine Manager, a VMWare® adapter, a Rackspace® Adapter, and a Sun® VMOpsCenter Adapter. Other APIs illustrated include the Citrix® XenCenter® API 122 used to interface with a XenCenter cloud-computing environment 128, or a Sun® xVMOpsCenter API 123 used to interface with the xVMOpsCenter cloud-computing environment 129.

In some embodiments, the instruction is transmitted to the Amazon EC2® API 203 through connection module 118, which implements a secure (i.e., encrypted) connection between the platform and the cloud-computing environment, the platform and client network, or the cloud-computing environment and the client network to ensure secure communication between the platform and environment. Connection module 118 may be utilized, for example, when a cloud-computing environment does not provide a secure connection between a client and its cloud-provider network (e.g., a commercial cloud provider does not provide a secure connection as feature of their cloud services). Additionally, connection module 18 may be deployed and utilized on the client-side network when the client lacks a secure connection with the platform.

Figure 3:
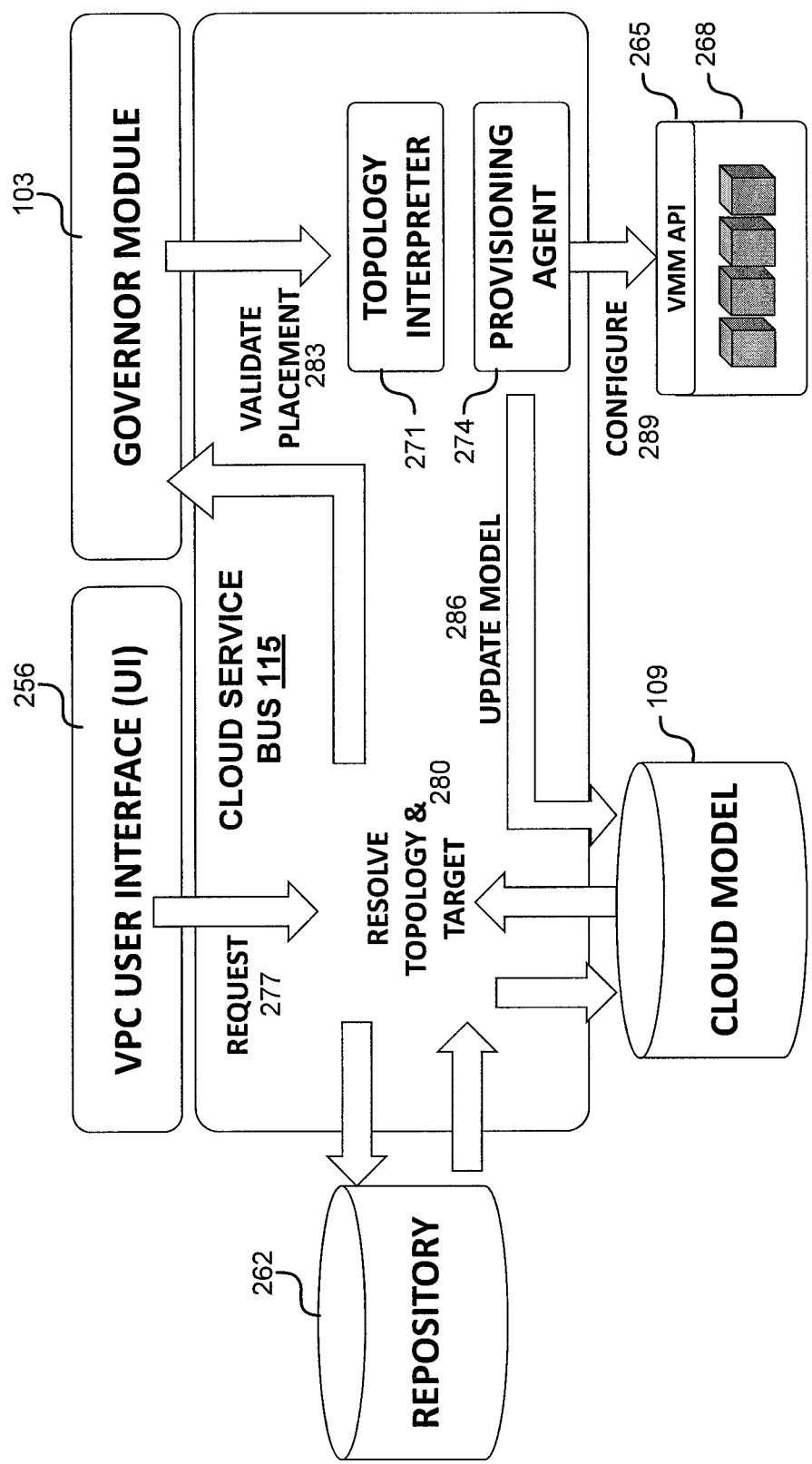
FIG. 3 is a diagram illustrating an example of provisioning in accordance with an embodiment of the present invention.

FIG. 3 provides a diagram illustrating an example of provisioning in accordance with an embodiment of the present invention. As illustrated in FIG. 3, upon receipt of a provisioning request from virtual private cloud (VPC) user interface 256, (asset) repository 262 is queried to extract all relevant metamodel information for the deployable assets (e.g., cloud-computing resource), such as a cloud-computing service have a specific topology. A simple topology may comprise a single cloud-computing resource (e.g., operating system running on a virtual machine) or a single tier of cloud-computing resource instances (e.g., LAMP server), combined to provide a cloud-computing service such as a web front-end. A more complex topology may comprise more than one tier of related cloud-computing resource instances such as a back-end database service tier, middleware tier, and web front-end tier, each tier performing a related service as part of delivery of an application to a set of users. The cloud model 109 is queried 280 to match the type(s) of cloud-computing resource instance with an appropriate provisioning request.

Upon a successful match, a policy management engine within governor module 103 is queried to ensure current policies allow for provisioning the cloud-computing resource from a cloud-computing environment, thereby providing "valid" or "right" placement 283. Topology interpreter 271 examines the request for the relationships of the cloud-computing resource instance(s) being requested and the access list (network port) assignments for the instance(s), and then passes the information to provisioning agent 274. Provisioning agent 274, in turn, queues the startup requests for the cloud-computing resource instances based on the defined startup order of the topology and provisions the instances and access list requests 289 through the virtual machine manager (VMM) API.

Figure 4:
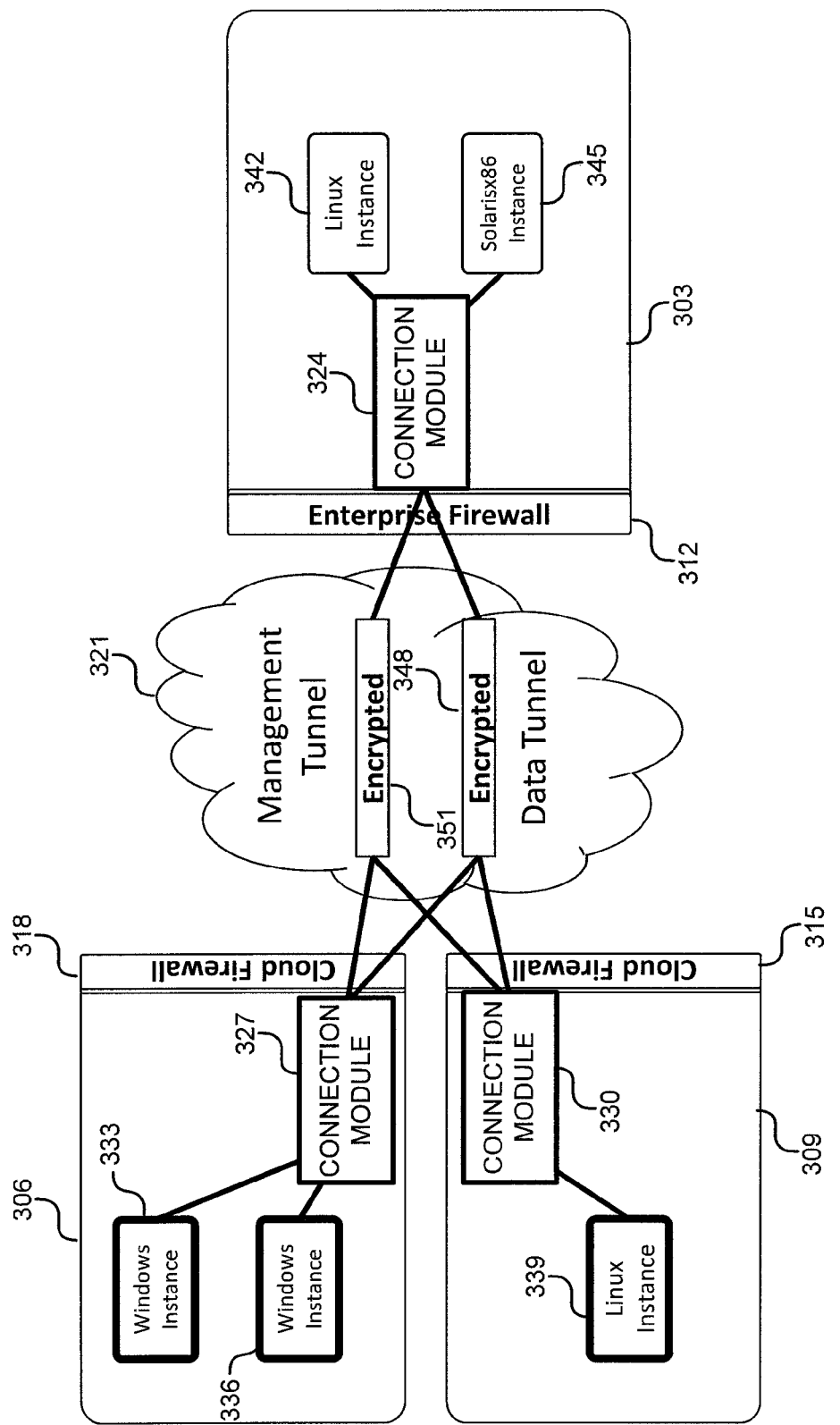
FIG. 4 is a diagram illustrating an example use of a connection module in accordance with an embodiment of the present invention.

FIG. 4 is a diagram illustrating an example use of a connection module in accordance with an embodiment of the present invention. Specifically, illustrated are two cloud-computing environments 306 and 309 each running instances of either Microsoft® Windows (333) or a distribution of Linux (339). Each cloud-computing environment is configured with a cloud firewall (315, 318) that blocks specified network traffic and defends the environments against malicious network traffic.

Illustrated opposite the cloud-computing environments is client network 303 (e.g., enterprise network) that has an instance of Linux 342 and Solaris (×86) operating and is equipped with it is an enterprise firewall 312. In order for the cloud-computing environments (306, 309) to communicate with client network 303 over external network 321 (e.g., the Internet), connection modules (324, 327, 330) are deployed on the three entities in order to establish and maintain encrypted communication tunnels (348, 351) between the cloud-computing environments (306, 309) and the client network 303. In addition, connection modules (324, 327, 330) establishes these encrypted communication tunnels (348, 351) through allowed ports on the firewalls (312, 315, 318). In FIG. 4, the connection modules (324, 327, 330) establish one encrypted tunnel for management (351) and another encrypted tunnel for data (348).

As noted before, connection modules such as those illustrated may be utilized when a secure connection is not readily available between a cloud-computing platform of an embodiment and a cloud-computing environment, between the cloud-computing platform of the embodiment and the client network, or between the cloud-computing environment and client the client network.

Figure 5:
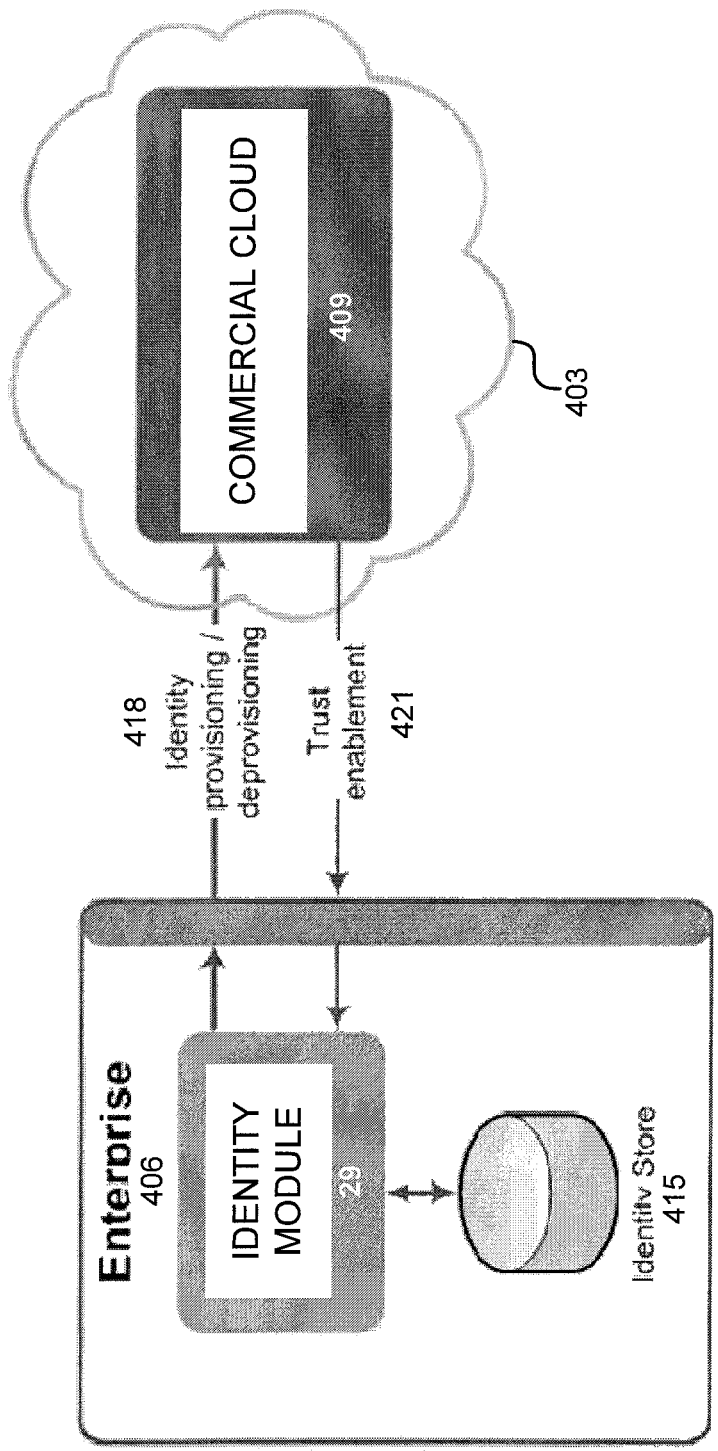
FIG. 5 is a diagram illustrating an example use of an identity module in accordance with an embodiment of the present invention.

FIG. 5 is a diagram illustrating an example use of an identity module in accordance with an embodiment of the present invention. In FIG. 5, enterprise network 406 is illustrated comprising identity module 29 in accordance with an embodiment, and identity store 415. Illustrated opposite the enterprise network is a cloud provider network 403 that is providing commercial cloud 409 (e.g., cloud-computing resource for a cloud-computing service) to enterprise network 406.

Identity module 29 facilitates identity provisioning and de-provisioning 418 (i.e., sign-on and sign-off) of a user to a service provided on a public (e.g., commercial) or private cloud. In some embodiments, identity module 29 performs this service by authenticating the user using the client's authentication system (i.e., identity store 415). For example, identity module 29 may authenticate a user using a locally deployed service, such as Netegrity®, Oracle OAM®, Microsoft® Active Directory, RSA® Cleartrust, Lightweight Directory Access Protocol (LDAP), and Kerberos.

In some embodiments, once a user is successfully authenticated using identity store 415, identity module 29 redirects that user's credentials to the cloud-computing service for authentication. Once the cloud-computing service successfully authenticates the user based on the forwarded user credentials, the user is redirected to the logged in cloud-computing service. It should be noted that identity capabilities may be applied to a cloud-computing resource as well as to a user, such that a specific cloud-computing resource may be authorized (based on its identity) to be used in connection with execution of a computer workload.

Figure 6:
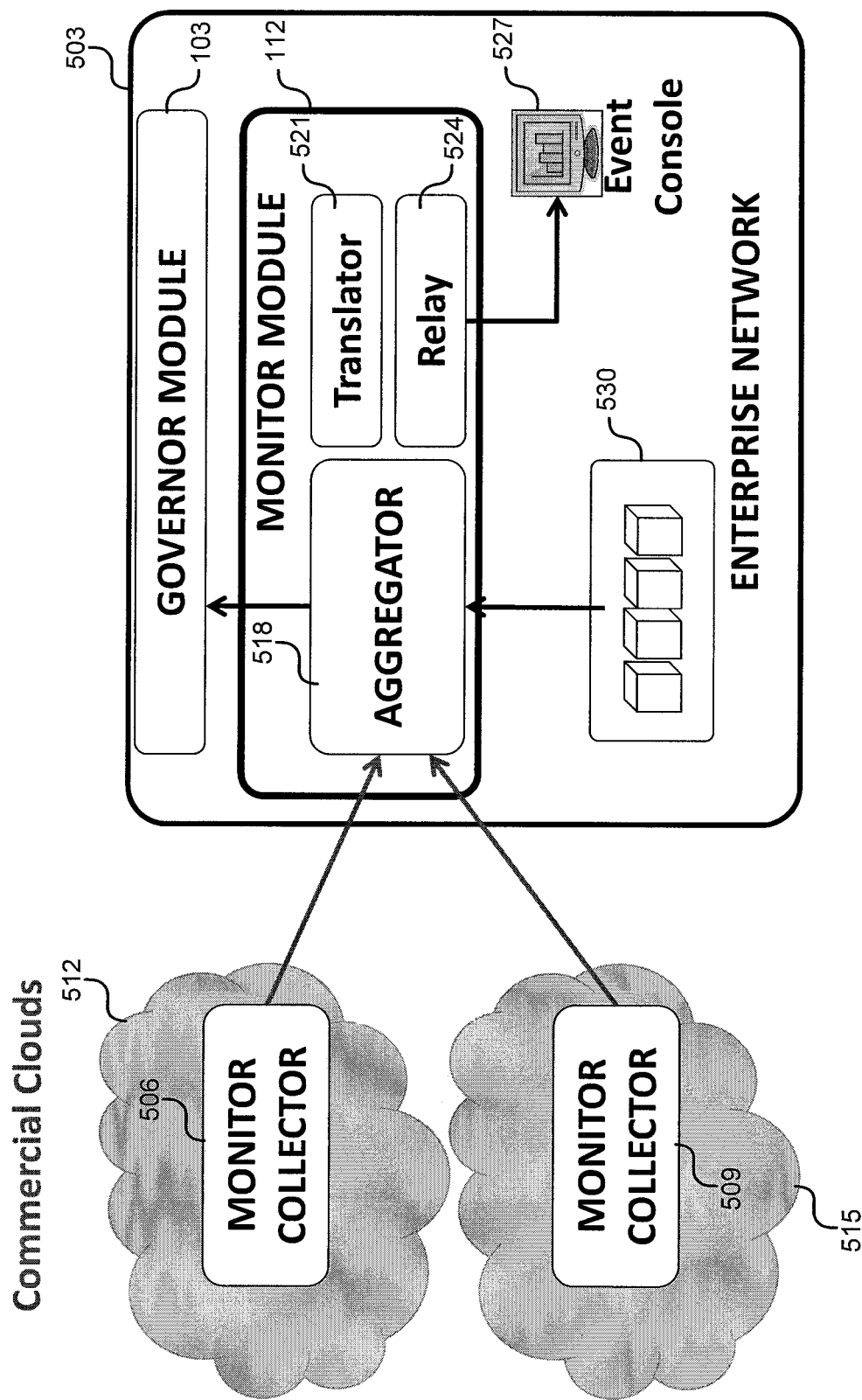
FIG. 6 is a diagram illustrating an example use of a monitor module in accordance with an embodiment of the present invention.

FIG. 6 is a diagram illustrating an example use of a monitor module in accordance with an embodiment of the present invention. As illustrated, governor module 103, monitor module 112 and private internal clouds 530 reside on enterprise network 503. Commercial clouds 512 and 515 are providing cloud-computing resources to the enterprise network 503. Monitor module 112 is responsible for monitoring the status and utilization of commercial clouds 512 and 515, and deploy a monitor collector 506 and 509 to the commercial clouds 512 and 515 to collect and transmit such information to monitor module 112.

Aggregator 518 receives the information from individual monitor collectors (506, 509) and monitor collectors (not shown) deployed to private internal cloud 530, and records the (received) monitor information for governance purpose, provisioning purposes, or administrative purposes (e.g., event reporting). Monitor module 112 uses translator 521 to interpret the monitor information from the commercial clouds (512, 515) and relays (524) the interpreted monitor information to event console 527. Aggregator 518 also forwards monitor information to governor module 103 to enable the module to govern the operations of cloud-computing resources and cloud-computing services being managed by a cloud-computing platform in accordance with an embodiment.

Figure 7:
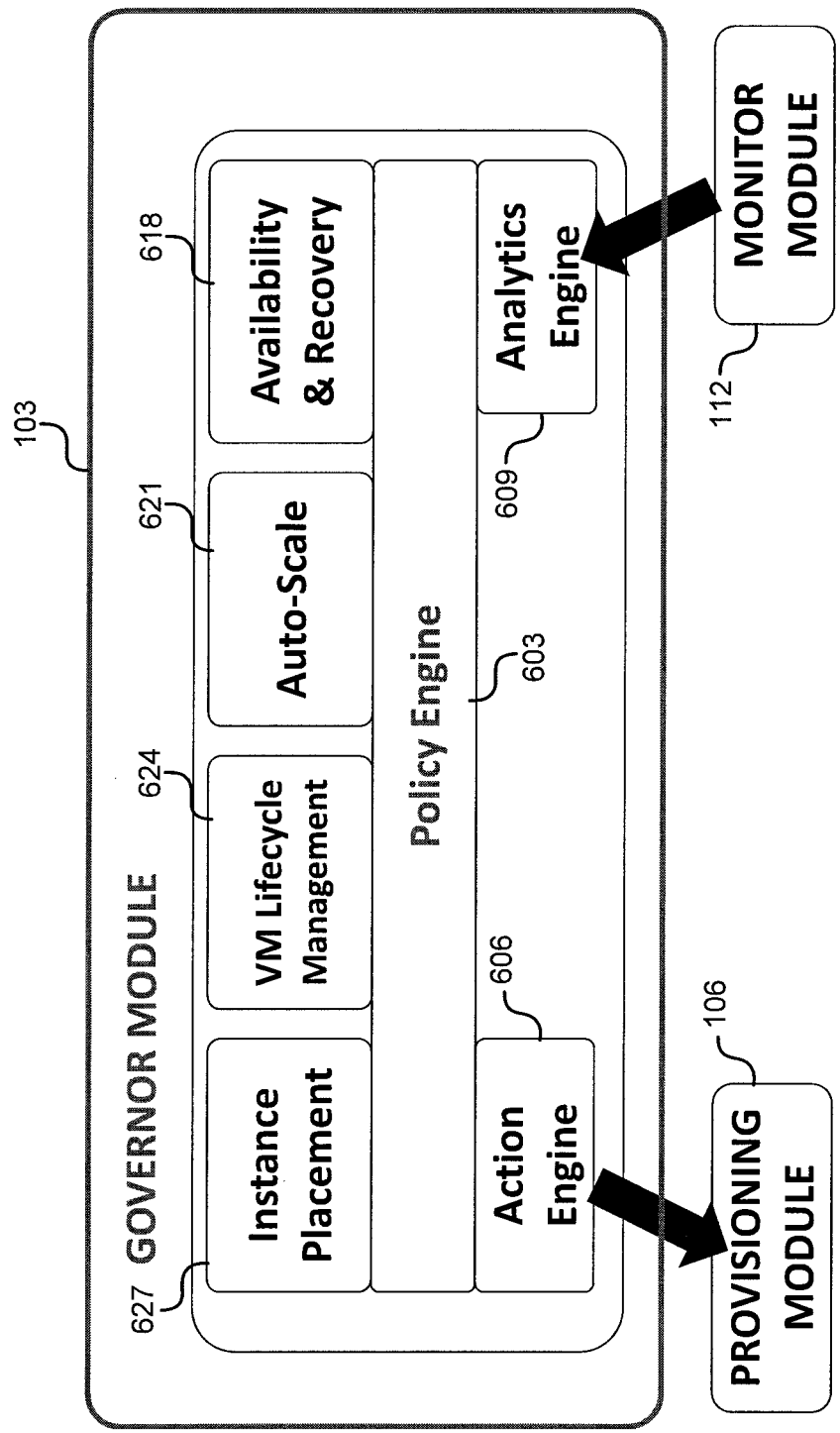
FIG. 7 is a diagram illustrating an example governor module in accordance with an embodiment of the present invention.

FIG. 7 is a diagram illustrating example governor module 103 in accordance with an embodiment of the present invention. Governor module 103 applies constraints, conditions, non-security policies, and security policies on cloud-computing resources and cloud-computing services being managed by a cloud-computing platform in accordance with an embodiment. In the illustrated embodiment, governor module 103 governs the cloud-computing resources and services by using monitoring information (from cloud-computing resources) provided by monitor module 112, and then issuing management actions (e.g. VPC actions) to cloud-computing resources based on monitoring information and the constraints, conditions, and policies the governor is applying to the cloud-computing resources.

In order to apply the constraints, conditions, and policies, governor module 103 uses analytics engine 609 to analyze monitoring information from monitor module 112 and, then, uses the analysis information to apply the constraints, conditions, and policies through policy engine 603. Based on the application of the constraints, conditions, and policies, policy engine 603 instructs action engine 606 to issue management actions to provisioning module 106 (e.g., issue management actions to increase or decrease the number of cloud-computing resources based on CPU utilization of the existing resources).

In the illustrated embodiment, governor module 103 utilizes instance placement 627 to make decisions on where to place an instance of a cloud-computing resource. For example, when an image is built for a cloud-computing service using a builder module, it can be tagged (e.g., using a metamodel) to prevent deployment to certain zones (e.g., security zone) as part of a security policy, cost control policy, performance or availability management policy. Instance placement 627 may cause the governor module 103 to place an instance of a cloud-computing resource based on availability of client-computing resources, or (real-time) performance of particular clouds. Virtual Machine (VM) lifecycle management 624 may be utilized by governor module 103 to determine and enforce expiration of virtual machines Auto-scale 621 may be utilized by governor module 103 to scale computer workloads being performed on one or more a cloud-computing resources. Auto-scale 621 can add or remove instances of cloud-computing resources to increase or decrease the performance of computer workloads based on monitored resource consumption, a schedule, or a set of rules. Availability & disaster recovery 618 may be utilized when operation of a cloud-computing resource has failed and the failed cloud-computing resource must be recovered according to the constraints, conditions, or policies governed by governor module 103.

Figure 8:
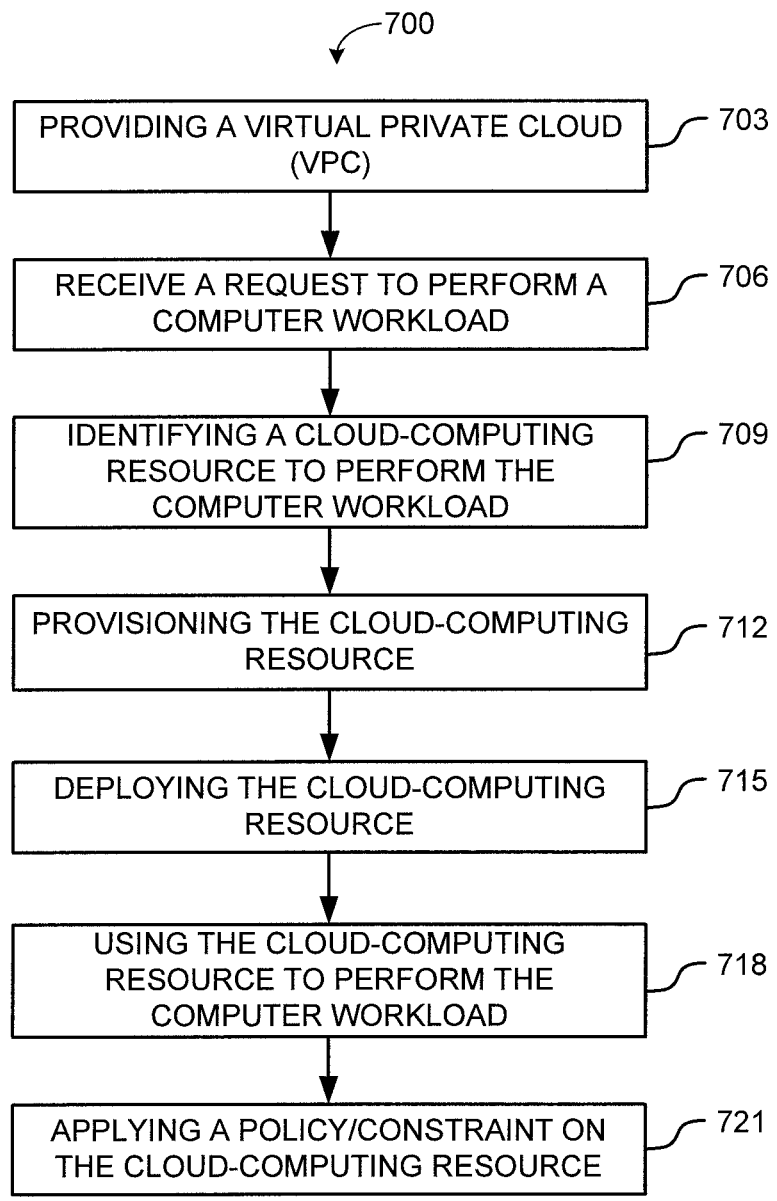
FIG. 8 is a flowchart illustrating an example method in accordance with an embodiment of the present invention.

FIG. 8 is a flowchart illustrating an example method 700 in accordance with an embodiment of the present invention. Method 700 begins at operation 703 by providing a user a virtual private cloud (VPC) configured to utilize a cloud-computing resource from the plurality of cloud-computing resources to perform a computer workload. At operation 706, method 700 then receives a request to perform the computer workload within the virtual private cloud. For example, in some embodiments, the computer workload may be an application, a server, a platform (e.g., LAMP server), or an infrastructure element (e.g., load-balancing unit). In another example, receiving the request to perform the computer workload comprises: receiving an application to be migrated to cloud-computing environment for execution; and identifying the computer workload as necessary for executing the application. In yet another example, method 700 receives a computing workflow to be performed in the cloud-computing environment; and then identifies a computer workload to perform the computing workflow.

Then, at operation 709, method 700 identifies a cloud-computing resource to perform the computer workload. For example, identifying the cloud-computing resource may be based on a workload score determined by a scoring logic. For instance, the scoring logic may be based on a business attribute of the computer workload (e.g., whether it is mission-critical, required to satisfy a legal obligation, required for an SLA, or the like), a technical attribute of the computer workload (e.g., storage required, bandwidth required, processing speed required, or the like), an operational attribute of the computer workload (time of day for availability, seasonality, or the like), or any combination thereof. In some embodiments, the scoring logic may further be editable or grouped into collections of logic to provide scoring plans for examining multiple types of computer workloads different ways (e.g., a grid computing scoring plan scoring workloads for an application destined to a cloud-computing service hosting grid workloads).

At operation 712, method 700 provisions the cloud-computing resource from the plurality of cloud-computing resources for the virtual private cloud (VPC). For example, method 700 may provision by locating an unreserved cloud-computing resource within the plurality of cloud-computing resources; and reserving for the virtual private cloud the unreserved cloud-computing resource.

Method 700 deploys the cloud-computing resource within the virtual private cloud at operation 715. Where the cloud-computing resource is a virtual computing resource, the virtual computing resource may be deployed under control of a virtual machine manager. In other embodiments, method 700 may deploy the cloud-computing resource according to a condition for the computer workload, where the condition determines if or when the cloud-computing resource can be deployed within the virtual private cloud to perform the computer workload. For example, the condition may require that the computer workload for backup servers only operate during evening periods. To optimize performance of a computer workload, some embodiments may deploy a pre-determined set of cloud-computing resources to optimize the computer workloads' performance.

Once the cloud-computing resource is deployed to the virtual private cloud, method 700 uses the cloud-computing resource to perform the computer workload at operation 718. Then, at operation 721, method 700 applies a policy or constraint on the cloud-computing resource. For example, where a policy is associated with a computer workload, method 700 may govern operation of the cloud-computing resource performing the computer workload in accordance with the policy.

Figure 9C:
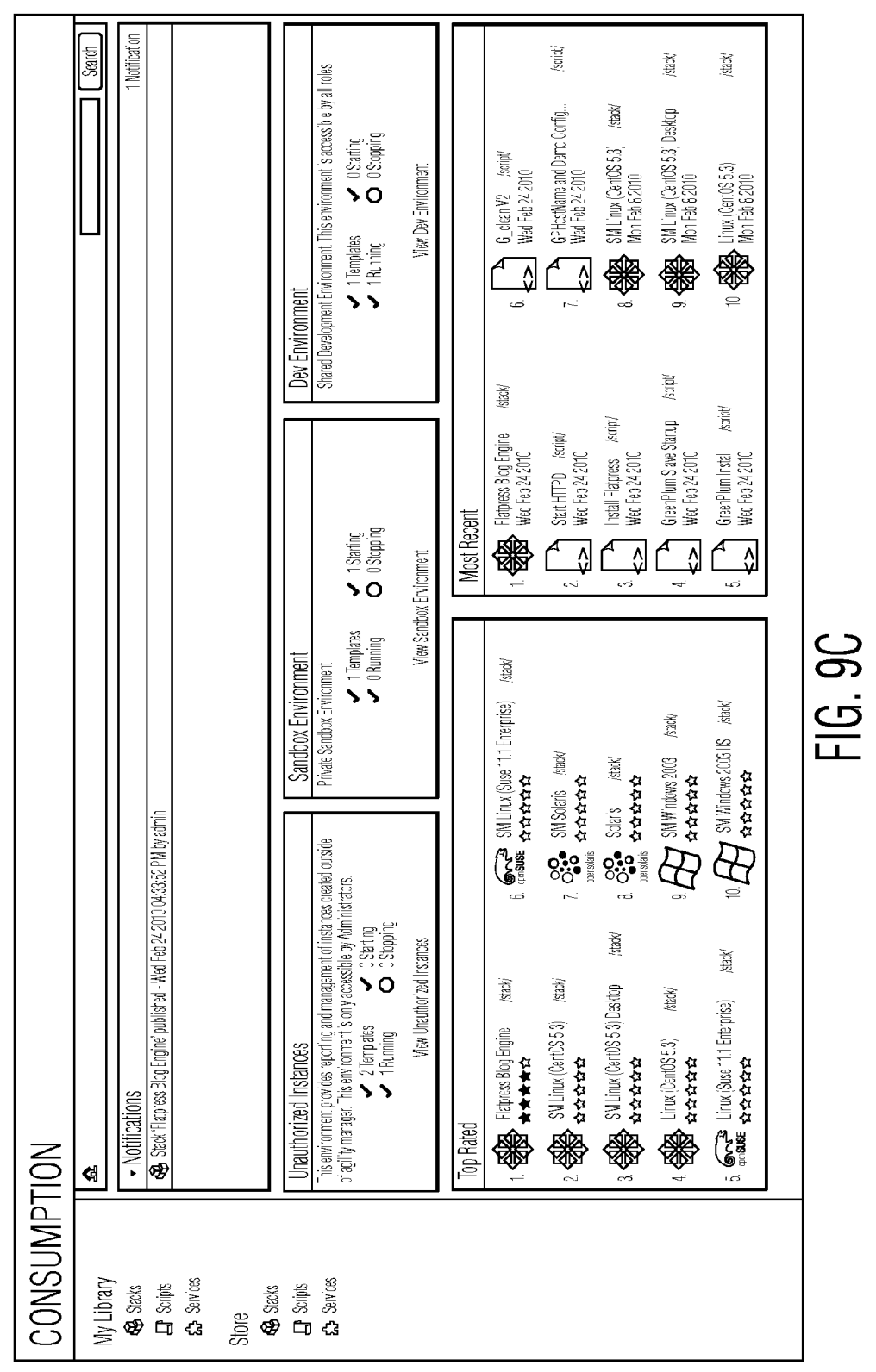
Figure 9D:
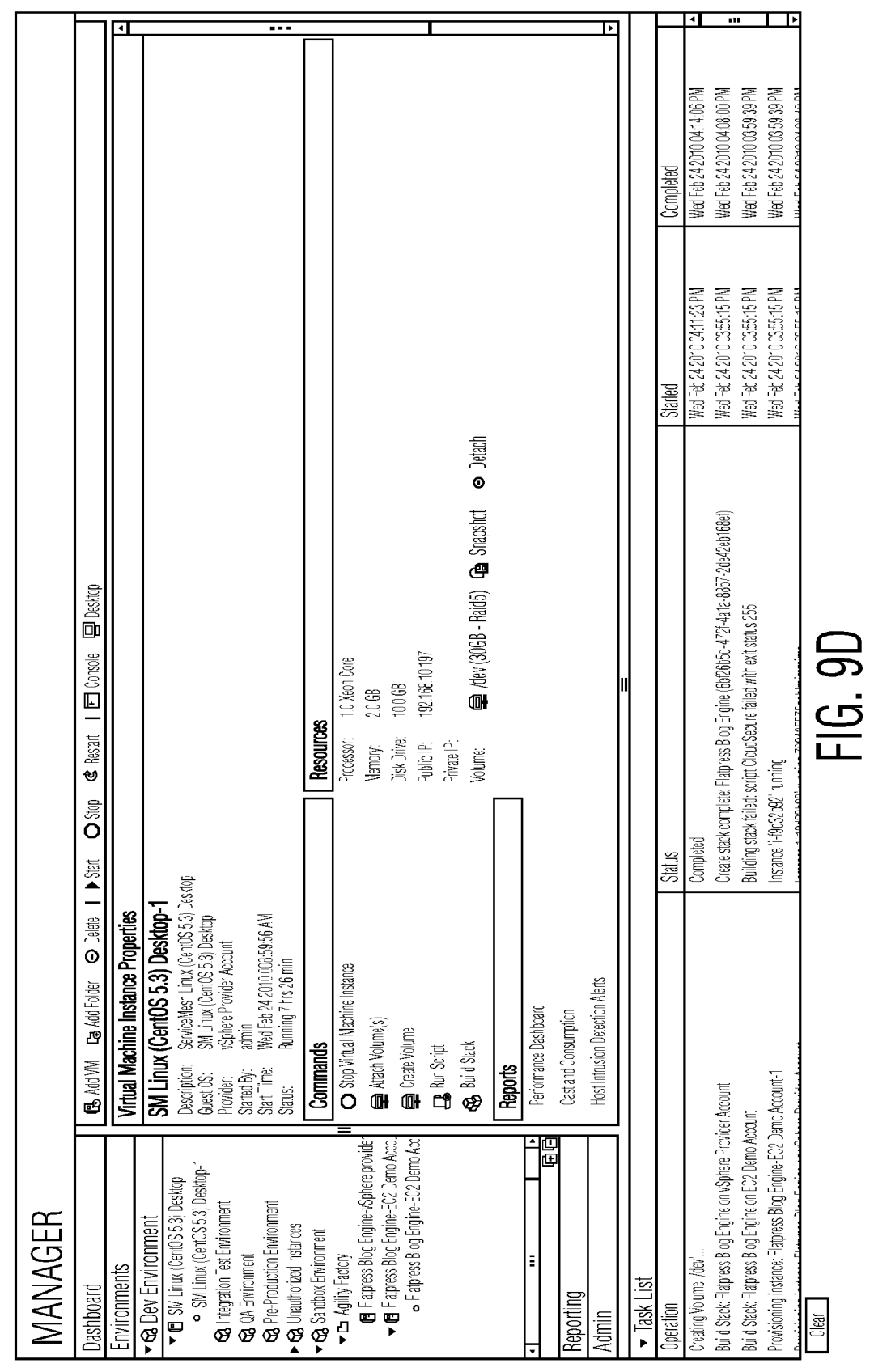

FIGS. 9A-9D are screenshots of an example user interface in accordance with some embodiments of the present invention. FIG. 9A depicts a screenshot of a user interface to a planner module, which can plan a cloud-computing service comprising one or more cloud-computing resources. In the screenshot shown, a corporate blog application and a logistics application are shown being planned for creation. FIG. 9B depicts a screenshot of a user interface to a builder module, which can build a cloud-computing service comprising one or more cloud-computing resources. The illustrated screenshot shows a stack being built on a Linux base stack. FIG. 9C depicts a screenshot of a user interface to a consumption module, which can be utilized by a user to subscribe to and use a cloud-computing service comprising one or more cloud-computing resources. The screenshot for the consumption module user interface allows a user to subscribe to and use such instances as Linux, Windows® 2003 IIS server, and Flatpress Blog Engine, and more FIG. 9D depicts a screenshot of a user interface to a manager module, which can be utilized by a user to manage cloud-computing service and its one or more cloud-computing resources. The screenshot shows the user interface of the manager module allowing a user to issue commands to cloud-computing services, such as stopping, running scripts, creating storage volumes, and attaching storage volumes to the cloud-computing services.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 10:
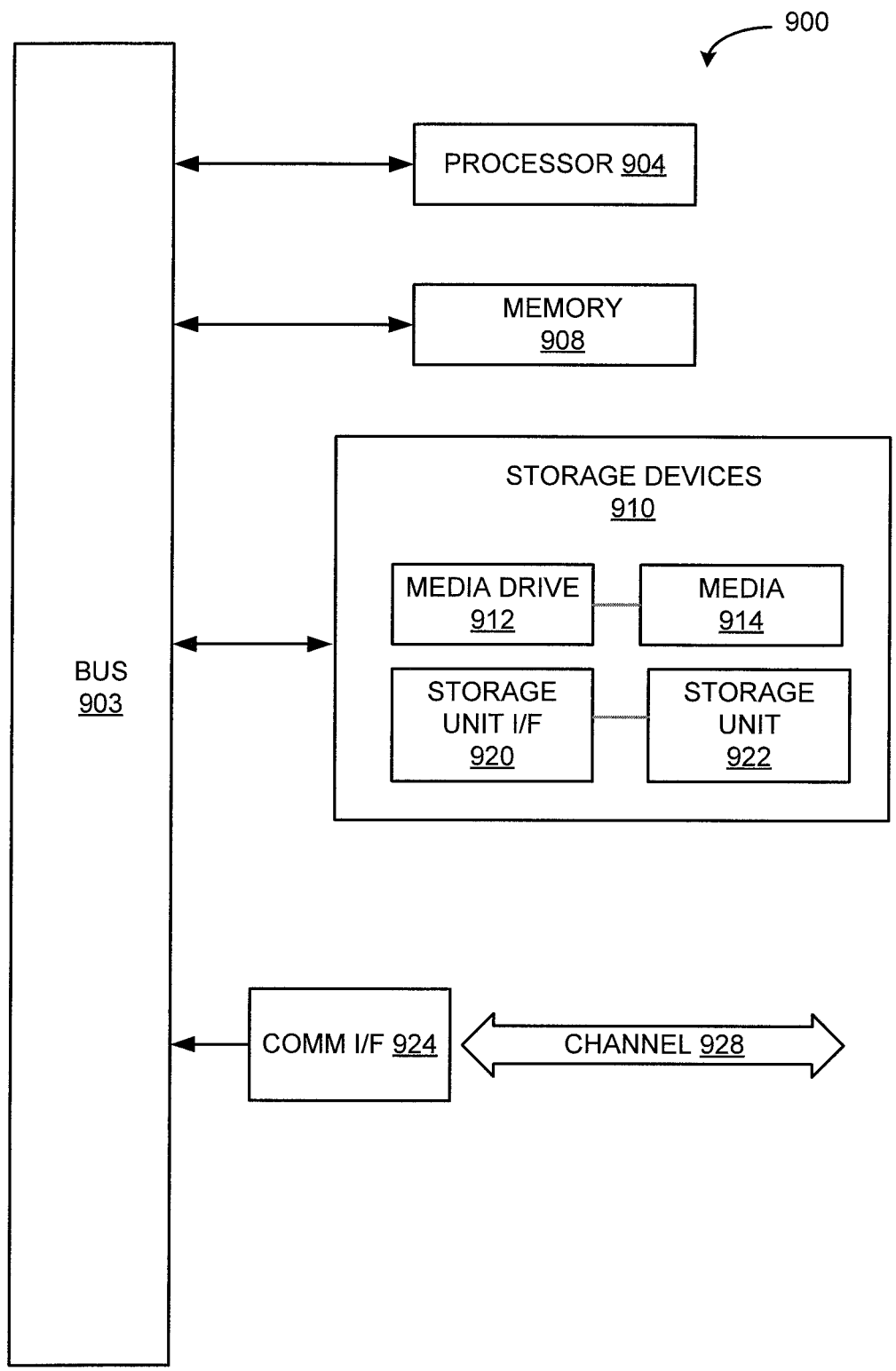
FIG. 10 is a diagram illustrating an example computing module for implementing various embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 900. After reading this description, it will become apparent to a person skilled in the relevant art how to implement the invention using other computing modules or architectures.

Referring now to FIG. 10, computing module 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning at least one, one or more or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A non-transitory computer readable medium comprising a plurality of cloud-computing resources, and comprising a computer-readable storage medium in which program instructions are stored, the program instructions configured to cause a computer system to perform the operations of:
   providing a virtual private cloud configured to utilize a cloud-computing resource from the plurality of cloud-computing resources to perform a computer workload;
   receiving a request to perform the computer workload within the virtual private cloud;
   provisioning the cloud-computing resource from the plurality of cloud-computing resources based on at least one resource utilization indication, wherein the at least one resource utilization indication comprises a scoring logic further comprising at least two selected from the group consisting of a business attribute, an operational attribute and a technical attribute, wherein the group describes mission-critical requirements, legal obligation requirements, service level agreement (SLA) requirements, time of day availability requirements, and seasonality requirements;
   deploying the cloud-computing resource within the virtual private cloud; and
   using the cloud-computing resource to perform the computer workload.

2. The non-transitory computer readable medium of claim 1, wherein provisioning the cloud-computing resource comprises:
   locating an unreserved cloud-computing resource within the plurality of cloud-computing resources; and
   reserving for the virtual private cloud the unreserved cloud-computing resource.

3. The non-transitory computer readable medium of claim 1, the operations further comprising:
   receiving a constraint for the cloud-computing resource or for the computer workload; and
   applying the constraint on the cloud-computing resource such that, when the cloud-computing resource is used to perform the computer workload, the cloud-computing resource's operation is limited according to the constraint.

4. The non-transitory computer readable medium of claim 1, the operations further comprising:
   defining a security zone such that the security zone comprises the virtual private cloud; and
   applying a security policy to the security zone such that, when the cloud-computing resource deployed in the virtual private cloud that is used to perform the computer workload, the cloud-computing resource's operation or the computer workload's performance is subject to the security policy.

5. The non-transitory computer readable medium of claim 4, wherein the security zone is defined according to a physical location of the virtual private cloud's usage, a network location of the virtual private cloud's usage, or attribute of an organization associated with the virtual private cloud.

6. The non-transitory computer readable medium of claim 4, wherein the security policy is an access policy, a read-permission policy, a write-permission policy, an edit-permission policy, a privacy-based policy, an encryption policy, or a cloud-computing resource utilization policy.

7. The non-transitory computer readable medium of claim 1, the operations further comprising declaring a static network address for the computer workload.

8. The non-transitory computer readable medium of claim 1, wherein where the cloud-computing resource is deployed under control of a virtual machine manager.

9. The non-transitory computer readable medium of claim 1, the operations further comprising:
receiving at a central policy server a definition for a security policy, wherein the central policy server is configured to associate the security policy to the computer workload or the cloud-computing resource performing the computer workload; and
pushing the security policy to the cloud-computing resource.

10. The non-transitory computer readable medium of claim 1, wherein the cloud-computing resource is an infrastructure element, and the operations further comprising:
providing a user interface that allows a user to deploy or configure the infrastructure element;
setting, through the user interface, a policy to the infrastructure element; and
applying the policy to the infrastructure element when the infrastructure element is deployed within the virtual private cloud.

11. The non-transitory computer readable medium of claim 10, the operations further comprising:
determining a reference design for the infrastructure element; and
deploying the infrastructure element in the virtual private cloud according to the reference design.

12. The non-transitory computer readable medium of claim 1, the operations further comprising:
associating a policy with the computer workload to be performed within the virtual private cloud; and
applying the policy to the cloud-computing resource performing the computer workload during the computer workload's performance.

13. The non-transitory computer readable medium of claim 1, wherein receiving the request to perform the computer workload comprises:
receiving an application to be migrated to cloud-computing environment for execution; and
identifying the computer workload as necessary for executing the application.

14. The non-transitory computer readable medium of claim 1, the operations further comprising:
using an adapter to connect the virtual private cloud to the cloud-computing resource;
using a metamodel data structure to store an association between a computer workload and a policy; and
pushing the metamodel data structure to the adapter such that, when the cloud-computing resource is deployed within the virtual private cloud to perform the computer workload, the adapter applies the policy to the computer workload or the cloud-computing resource performing the computer workload.

15. The non-transitory computer readable medium of claim 14, the operations further comprising:
moving the computer workload from using the cloud-computing resource to using a second cloud-computing resource, wherein the second cloud-computing resource uses a second adapter to connect the virtual private cloud to the second cloud-computing resource; and
pushing the metamodel data structure to the second adapter such that when the second cloud-computing resource is deployed within the virtual private cloud to perform the computer workload, the second adapter applies the policy to the second cloud-computing resource performing the cloud computer workload.

16. The non-transitory computer readable medium of claim 1, wherein the cloud-computing resource is a physical computing resource or a cloud-computing resource.

17. The non-transitory computer readable medium of claim 1, wherein the cloud-computing resource is a storage resource, a network resource, an internal private resource, an external private resource, a secure public resource, a platform-as-a-service, and a software-as-a-service, or an infrastructure-as-a-service.

18. The non-transitory computer readable medium of claim 1, wherein the cloud-computing resource is a hybrid cloud-computing resource comprising at least two of a physical resource, a virtualized resource, a private resource, a public resource, an internal resource, or an external resource.

19. The non-transitory computer readable medium of claim 1, the operations further comprising identifying the cloud-computing resource for performing the computer workload.

20. The non-transitory computer readable medium of claim 19, wherein identifying the cloud computing resource is based on a workload score determined by the scoring logic.

21. The non-transitory computer readable medium of claim 20, wherein the scoring logic is based on the business attribute of the computer workload, the technical attribute of the computer workload, and the operational attribute of the computer workload.

22. The non-transitory computer readable medium of claim 20, wherein the scoring logic is editable.

23. The non-transitory computer readable medium of claim 20, wherein the scoring logic can be dynamically updated and combined to form specialized scoring plans for analyzing computer workloads.

24. The non-transitory computer readable medium of claim 1, wherein the computer workload is scalable.

25. The non-transitory computer readable medium of claim 1, wherein deploying the cloud-computing resource comprises deploying a pre-determined set of cloud-computing resources to optimize the computer workload's performance.

26. The non-transitory computer readable medium of claim 1, the operations further comprising setting a condition for the computer workload, wherein the condition determines if or when the cloud-computing resource can be deployed within the virtual private cloud to perform the computer workload.

27. A non-transitory computer readable medium comprising a plurality of cloud-computing resources, and comprising a computer-readable storage medium in which program instructions are stored, the program instructions configured to cause a computer system to perform the operations of:
receiving a computing workflow to be performed in the cloud-computing environment;
identifying a computer workload to perform the computing workflows;
associating a policy with the computer workload, wherein the policy is at least partially based on at least one received resource utilization indication, wherein the at least one resource utilization indication comprises a scoring logic further comprising at least two selected from the group consisting of a business attribute, an operational attribute and a technical attribute, wherein the group describes mission-critical requirements, legal obligation requirements, SLA requirements, time of day availability requirements, and seasonality requirements;
testing the computer workload in a pre-production virtual private cloud within the cloud-computing environment;
deploying the computer workload in a production virtual private cloud within the clouding-computing environment; and applying the policy to the computer workload during the computer workload's performance within the production virtual private cloud for consumption.

28. The non-transitory computer readable medium of claim 27, wherein the identifying the computer workload to perform the computing workflow involves identifying a plurality of computer workloads to perform the computing workflow.

29. A system for providing a cloud-computing service from a cloud-computing environment comprising a plurality of cloud-computing resources, the system comprising:
   a management engine configured to manage a cloud-computing resource of the plurality of cloud-computing resources as a cloud-computing service, wherein the cloud-computing service performs a computer workload and the cloud-computing service comprises the cloud-computing resource;
   an adapter configured to connect to the cloud-computing resource to the system and translate a management instruction received from the management engine into a cloud application program interface call for the cloud-computing resource;
   a cloud service bus configured to route the management instruction from the management engine to the adapter;
   a consumption engine configured to allow a user to subscribe the cloud-computing service;
   a planning engine configured to plan the cloud-computing service; and
   a build engine configured to build the cloud-computing service from the cloud-computing resource and publish the cloud-computing service to the consumption engine;
   wherein the build engine accesses at least one resource utilization indication from at least one user for use by the consumption engine;
   wherein the at least one resource utilization indication comprises a scoring logic further comprising at least two selected from the group consisting of a business attribute, an operational attribute and a technical attribute, wherein the group describes mission-critical requirements, legal obligation requirements, SLA requirements, time of day availability requirements, and seasonality requirements.

30. The system of claim 29, wherein the system provides a user interface configured to provide access to the system as a virtual private cloud.

31. The system of claim 29, the system further comprising a policy engine configured to enforce a policy on the cloud-computing service through the management engine.

32. The system of claim 31, wherein the management engine, through the adapter, monitors a cloud-computing resource of the cloud-computing service and provisions the cloud-computing resource according to the policy engine module.

33. The system of claim 29, wherein managing the cloud-computing service comprises provisioning the cloud-computing service for a virtual private cloud, releasing the cloud-computing service for the virtual private cloud, accounting for usage of the cloud-computing service in the virtual private cloud, or monitoring the cloud-computing service.

34. The system of claim 29, the system further comprising an identity management engine configured to connect to an authentication system and authenticate the user for the cloud-computing service.

35. The system of claim 29, the system further comprising an encryption engine configured to perform encryption services for the cloud-computing service.

36. The system of claim 29, the system further comprising a connection engine configured to securely connect the cloud-computing service to a client network or a cloud provider network.

37. The system of claim 29, wherein the management engine is further configured to collect and process cost and consumption data from a cloud computing resource provider and present that data, to a billing system through an application program interface.

38. The system of claim 29, the system further comprising a cloud model utilized by the adapter to translate the management instruction to a cloud API call.

* * * * *